(No Model.)　　　E. D. HUMPHREYS.　　2 Sheets—Sheet 1.
EARTH SCRAPER.
No. 273,538.　　　　　Patented Mar. 6, 1883.
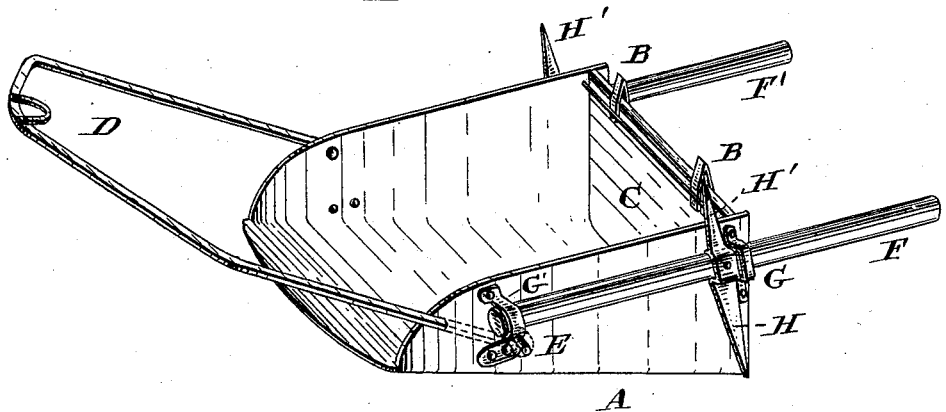
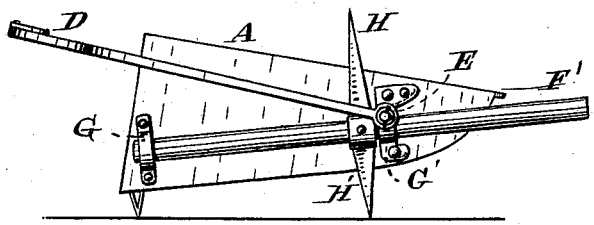
Attest
Carl Spengel
Inventor
Edward D. Humphreys
by Knight Bros.
Atty's (No Model.) 2 Sheets—Sheet 2.

E. D. HUMPHREYS.
EARTH SCRAPER.

No. 273,538. Patented Mar. 6, 1883.

Attest
Carl Spengel
Wm J. Sayers

Inventor
Edward D. Humphreys.
by Knight Bros
Atty's

UNITED STATES PATENT OFFICE.

EDWARD D. HUMPHREYS, OF CINCINNATI, OHIO, ASSIGNOR OF ONE-HALF TO DAVID HUMPHREYS, OF SAME PLACE.

EARTH-SCRAPER.

SPECIFICATION forming part of Letters Patent No. 273,538, dated March 6, 1883.

Application filed November 6, 1882. (No model.)

*To all whom it may concern:*

Be it known that I, EDWARD D. HUMPHREYS, of Cincinnati, Hamilton county, Ohio, have invented a new and useful Improvement in Earth-Scrapers, of which the following is a specification.

The object of the invention is the production of a strong, simple, and effective earth-scraper that is both self-dumping and self-righting.

The distinguishing feature of my device is a pair of straight stilts or handles, which are capable of sliding longitudinally in sockets or sheaths upon the scraper-sides, and are provided with flukes or spurs which cause their automatic forward or backward sliding for the operations of dumping and scraping, respectively. When the scraper is in its proper position for scraping, the flukes aforesaid, by catching in the ground, prevent the handles taking part in the forward movement of the scraper, and said handles are consequently forced and held to their most rearward position, where the operator can conveniently handle them. The scraper having become charged or loaded, and sufficiently lifted at rear to enable the draft to invert it, similar flukes on the opposite sides of the handles encounter the ground and operate to push the handles in the reverse direction and wholly clear of the draft-bail, and consequently permit the scraper to perform a complete somersault, so as to resume the normal or effective scraping position, all by animal-power, without loss of time or unnecessary labor on the part of the operator.

Figure 3:
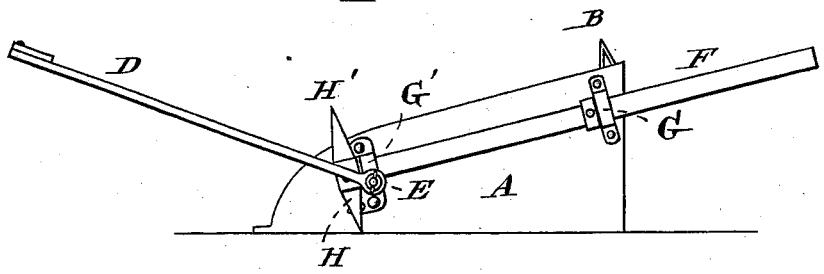
Figure 4:
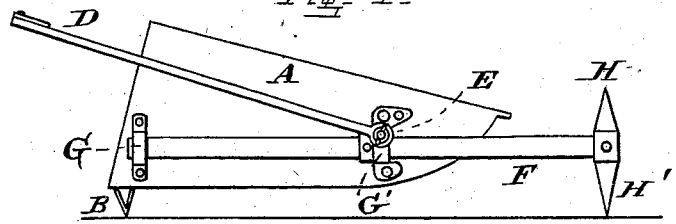

In the accompanying drawings, Figure 1 is a perspective view of a scraper embodying my invention, the same being shown in its normal position. Fig. 2 is a side elevation of the same in the acts of dumping and reversing. Figs. 3 and 4 are respectively side elevations, showing a modification of my invention in the normal and dumped conditions.

A may represent the body or scoop proper of any suitable earth-scraper, whether of wood or metal.

B are customary spurs from the top edge of the back board, C, to facilitate reversal from the inverted condition.

D is the bail or clevis, hinged to the scraper-sides, as at E, at such height and such distance from the scraper-nose as to cause the scraper, when left at liberty, to slide over the ground surface without either entering the ground or inverting, and so that a slight pressure exerted by the operator upon the handles will, if that pressure be downward, cause the scraper-nose to penetrate the ground, and, if upward, will cause the inversion of and consequent dumping of the scraper, followed by its complete somersault. With this object in view, the bail-sides are set a sufficient distance laterally from the scraper-sides to permit the entire scraper-body, with its handles and their confining-sheaths, to revolve within it after the temporary forward protrusion of the handles by the fluke action already spoken of.

The distinguishing characteristic of my improvement is the pair of handles F F', which, instead of being attached rigidly to the scraper-sides, are made capable of sliding longitudinally within sheaths, staples, or sockets, of which there are two, G G', to each handle. Each handle is armed with two oppositely-directed flukes, H H', preferably attached to the handle at or about its mid-length. The flukes H, by catching slightly in the ground as the scraper is drawn forward by the team in the act of scraping, operate to compel the handles to assume and retain the rearward or normal position shown in Fig. 1, convenient for manipulation by the operator in the usual way of operating earth-scrapers. When the implement is inverted (see Fig. 2) the opposite flukes, H', engage in the ground and operate, by their resistance, to draw the handles toward the cutting-edge of the scraper, as shown in said figure, so as to permit the scraper-body, with its thus retracted handles, to pass clear through the bail in the continued rotation of the body, by which it resumes the normal position.

The above-described preferred form of my improvement may be varied in non-essential particulars. For example, the flukes H H', instead of being attached at the mid-length of the handles, may be attached at their extreme forward ends, (see Figs. 3 and 4,) and said handles be provided with a stop, J, to prevent the handles being drawn out of the sheaths when the implement is being drawn along in the capsized condition shown in Fig. 4.

I claim herein as new and of my invention—

In an earth-scraper, the longitudinally-sliding handles F F' in sheaths G G' upon the scraper-sides, said handles being armed with oppositely-extending flukes H H', as and for the purposes set forth.

In testimony of which invention I hereunto set my hand.

EDWARD D. HUMPHREYS.

Attest:
GEO. H. KNIGHT,
C. F. KNOWLTON.